United States Patent
Carusiello et al.

(10) Patent No.: US 12,276,366 B2
(45) Date of Patent: Apr. 15, 2025

(54) SYSTEM AND METHOD FOR PRODUCING SPRAY FOAM INSULATED PIPE WITH CHANNELS, TUBES OR CONDUITS

(71) Applicant: PERMA-PIPE, INC., Niles, IL (US)

(72) Inventors: John Carusiello, Lemont, IL (US); Sandeep Adka, Karnataka (IN)

(73) Assignee: PERMA-PIPE, INC., Niles, IL (US)

( * ) Notice: Subject to any disclaimer, the term of this patent is extended or adjusted under 35 U.S.C. 154(b) by 278 days.

(21) Appl. No.: 17/640,507

(22) PCT Filed: Sep. 4, 2019

(86) PCT No.: PCT/US2019/049501
§ 371 (c)(1),
(2) Date: Mar. 4, 2022

(87) PCT Pub. No.: WO2021/045740
PCT Pub. Date: Mar. 11, 2021

(65) Prior Publication Data
US 2022/0349512 A1    Nov. 3, 2022

(51) Int. Cl.
| F16L 59/02 | (2006.01) |
| B29C 44/12 | (2006.01) |
| B29C 63/14 | (2006.01) |
| B29K 25/00 | (2006.01) |
| B29K 75/00 | (2006.01) |

(Continued)

(52) U.S. Cl.
CPC ............ *F16L 59/028* (2013.01); *B29C 44/12* (2013.01); *B29C 63/14* (2013.01); *F16L 59/027* (2013.01); *F16L 59/029* (2013.01); *F16L 59/04* (2013.01); *B29K 2025/06* (2013.01); *B29K 2075/00* (2013.01); *B29K 2105/04* (2013.01); *B29K 2995/0015* (2013.01)

(58) Field of Classification Search
None
See application file for complete search history.

(56) References Cited

U.S. PATENT DOCUMENTS

| 4,094,715 A |   | 6/1978 | Henderson et al. |
| 4,531,991 A | * | 7/1985 | Ziemek ............. B29C 48/151 |
|             |   |        | 156/247 |
| 2013/0248013 A1 |   | 9/2013 | Chakkalakal |

FOREIGN PATENT DOCUMENTS

| EP | 2305443 A1 * | 4/2011 | .......... B29C 44/324 |
| IN | 0116DEL13 A  | 1/2013 | |

(Continued)

OTHER PUBLICATIONS

International Search Report; priority document.

*Primary Examiner* — Barbara J Musser
(74) *Attorney, Agent, or Firm* — Greer, Burns & Crain, Ltd.

(57) ABSTRACT

A length of a main pipe is provided. The main pipe has an internal surface and an external surface. A plurality of channels, tubes or conduits is attached to the external surface of the main pipe and spaced about a circumference thereof. A spray foam insulation is applied to the external surface of the main pipe. Prior to curing the spray foam insulation, a compressive force is applied against an exposed outer surface of the spray foam insulation to prevent a bulge from forming over the channels, tubes or conduits so that the outer surface of the insulation has a uniform radius.

21 Claims, 14 Drawing Sheets

(51) Int. Cl.
 *B29K 105/04* (2006.01)
 *F16L 59/04* (2006.01)

(56) References Cited

FOREIGN PATENT DOCUMENTS

JP S5876235 A 5/1983
WO 2016156467 A1 10/2016

\* cited by examiner

SYSTEM AND METHOD FOR PRODUCING SPRAY FOAM INSULATED PIPE WITH CHANNELS, TUBES OR CONDUITS

CROSS-REFERENCE TO RELATED APPLICATIONS

This Application is a United States National Stage Application under 35 U.S.C. Section 371 of International Patent Application No. PCT/US2019/049501 filed on 4 Sep. 2019.

FEDERALLY SPONSORED RESEARCH OR DEVELOPMENT

N/A

TECHNICAL FIELD

The invention relates to piping systems; more particularly, the invention relates to piping systems with channels, tubes or conduits encapsulated with spray foam insulation.

BACKGROUND OF THE INVENTION

Piping systems for various applications require both thermal insulation and heat tracing to maintain the temperature of the fluid in the piping system at or above a certain temperature. These applications include flow assurance for onshore and offshore oil and gas, freeze protection for district heat and cooling and temperature maintenance for process fluid transportation, among others.

Foam insulation is used as a thermal insulation on pipe to keep the product inside the pipe within a specified temperature range. The foam insulation can be polyurethane, polyisocyanate, polystyrene or another material. In some cases, channels, tubes or conduits may be attached onto the external surface of the pipe under the foam insulation to allow for heat trace cables, electrical wiring, fiber optic cables, or some other purpose. When spray-applying foam insulation onto a pipe with channels, tubes or conduits attached to the external surface of the pipe, protrusions or bulges in the applied foam insulation occur due to the topography of the channels, tubes or conduits resulting in a non-circular and non-symmetrical outside diameter surface that is undesirable and difficult to use. This necessitates removing the bulge by cutting or grinding before spraying a second layer of foam insulation, and/or before applying an optional insulation jacket.

Additionally, the presence of channels, tubes or conduits about the outer circumference of a larger main pipe can make it difficult to apply spray foam insulation onto the larger diameter main pipe. Though rare, gaps in the spray foam insulation can develop at the contact points of the smaller channels, tubes or conduits with the larger main pipe. When these gaps develop, they can allow moisture to penetrate the cured spray foam insulation system.

The present invention is provided to solve the problems discussed above and other problems, and to provide advantages and aspects not provided by prior pipe systems of this type. A full discussion of the features and advantages of the present invention is deferred to the following detailed description, which proceeds with reference to the accompanying drawings.

SUMMARY OF THE INVENTION

A first specific embodiment of the present invention is directed to a method of insulating a pipe system. The method comprises the steps of: (1) providing a length of a main pipe having an internal surface and an external surface; (2) providing a plurality of channels, tubes or conduits attached to the external surface of the main pipe and spaced about a circumference thereof; (3) applying a spray foam insulation to the external surface of the main pipe; and (4) prior to a step of curing the spray foam insulation, applying a compressive force against an exposed outer surface of the spray foam insulation to prevent the formation of bulges over the channels, tubes or conduits.

The first specific embodiment may include one or more of the following additional steps or features, alone or in any reasonable combination. The method may further comprise the step of: wrapping a ribbon-shaped member under tension about the spray foam insulation, the plurality of channels, tubes or conduits and the main pipe in successive overlapping passes wherein the compressive force is supplied by the ribbon-shaped member. The ribbon-shaped member may be plastic, fabric or metal, or a combination thereof, such as a corona treated bonding film, corona treated bonding film with a diffusion barrier, an adhesive backed tape, or an adhesive backed tape with diffusion barrier. The corona treatment or adhesive may be on none, one or both sides of the ribbon-shaped member. The method may further comprise the step of: providing relative rotational movement between the main pipe and a source of the ribbon-shaped member. The method may further comprise the step of: providing relative linear movement between the main pipe and the source of the ribbon-shaped member. The method may further comprise the step of: producing a substantially uniform diameter of the pipe system such that a radius of the pipe system passing through a channel, tube or conduit in the plurality of channels, tubes or conduits is substantially equal to a radius of the pipe system not passing through a channel, tube or conduit. The method may further comprise the step of: curing the foam insulation. The method may further comprise the step of: applying an additional layer of spray foam insulation to an exposed outer surface of the ribbon-shaped member after the wrapping step. The method may further comprise the step of: removing the ribbon-shaped member from the main pipe. The method may further comprise the step of: applying an additional layer of insulation after the step of removing of the ribbon-shaped member. The method may further comprise the step of: engaging the ribbon-shaped member with a pressure roller after the wrapping step. The spray foam insulation may be deposited on the surface of the main pipe such that any gaps between the surface of the main pipe and each of the plurality of channels, tubes or conduits are filled with the spray foam insulation. A filling of the spray foam insulation into the gaps may prevent moisture from entering the pipe system between the spray foam insulation and the main pipe into the gaps. A filling of the spray foam insulation into the gaps may prevent moisture from being entrapped between the spray foam insulation and the main pipe.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
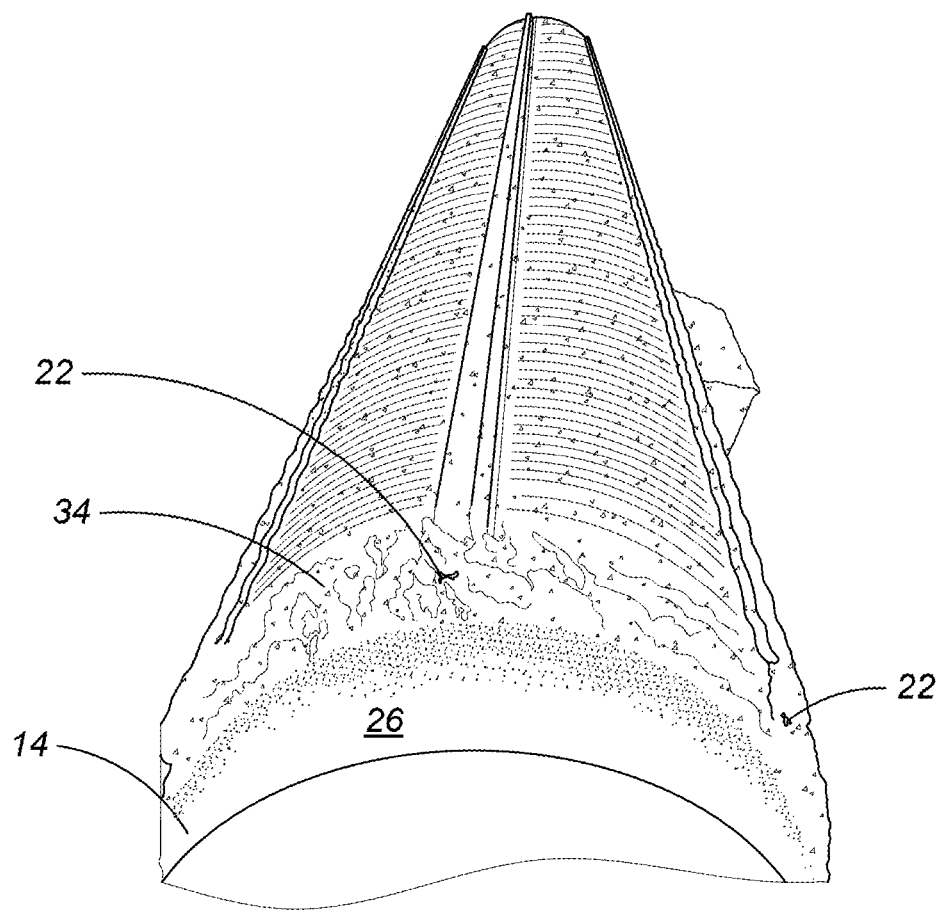
FIG. 1 is a view of a prior art pipe system with a spray foam insulation applied over a main pipe, a plurality of channels, tubes or conduits attached to an outer surface of the main pipe and the spray foam insulation bump over the channels, tubes or conduits.
Figure 2:
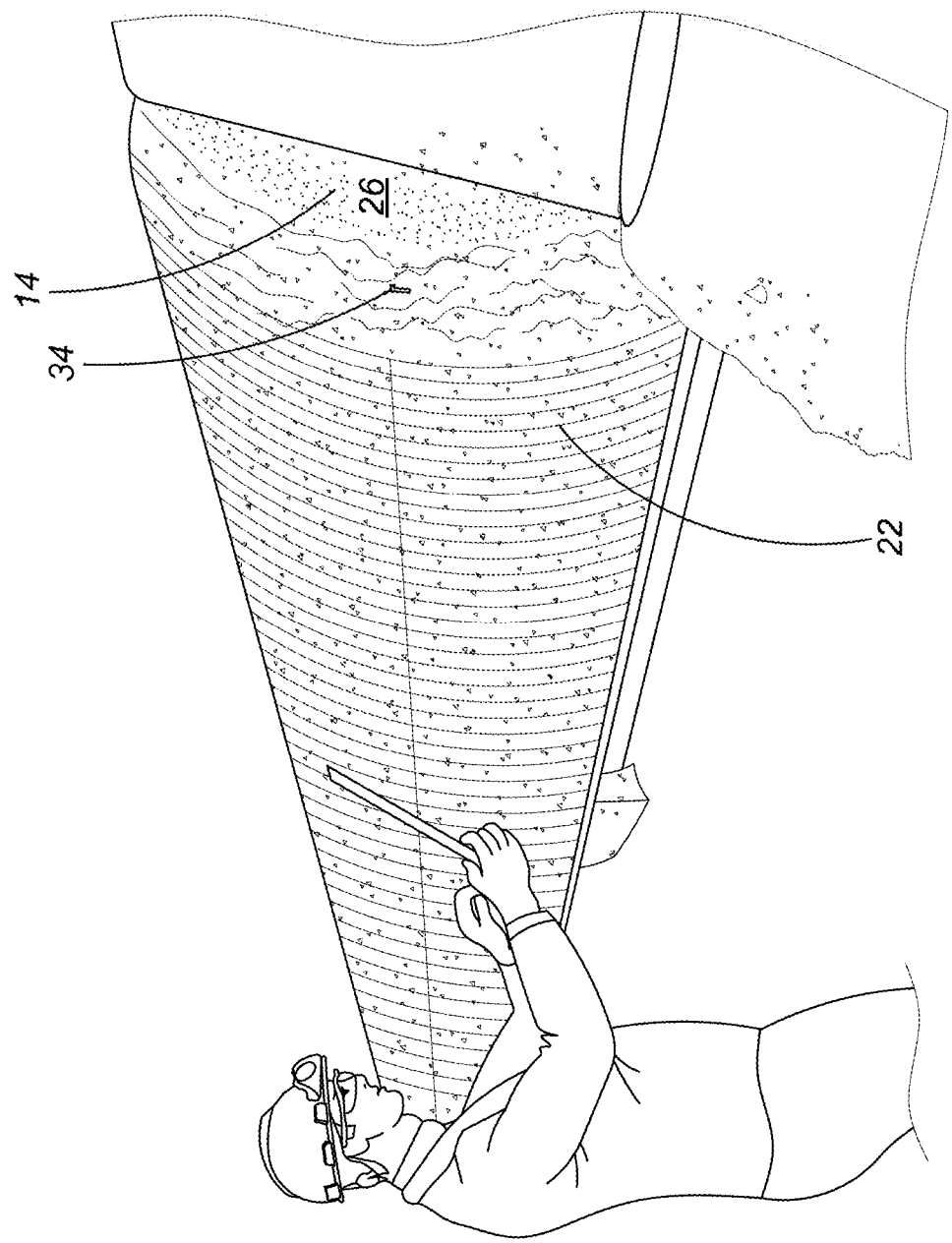
FIG. 2 is a prior art method of producing a pipe system showing the spray foam insulation bump over the channels, tubes or conduits being cut away.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is directed to a pipe system and a method for producing the pipe system. Generally, a ribbon-shaped member is wrapped under tension around a foam insulation during, or immediately after, a spray application of the foam insulation to a section of a main pipe. The ribbon-shaped member tension suppresses bulges of the foam insulation that form over channels, tubes or conduits positioned about the circumference of the main pipe as the foam insulation expands or rises. This eliminates an additional step of removing the bulges prior to adding additional layers of foam insulation and/or insulation jacketing. The ribbon-shaped member can be left in place or removed prior to additional layers of foam insulation and/or insulation jacketing. Alternatively, or in addition, to a ribbon-shaped member wrapped under tension, a compression roller can be used to suppress the bulges over the channels, tubes or conduits.

Referring generally to FIGS. 4-9, a pipe system 10 comprises a length of a main pipe 14, generally produced from a pipe material such as steel, plastic, ductile iron, etc. The main pipe 14 is centered about a longitudinal axis 50 and is linear in structure. The main pipe 14 defines a passageway through which a fluid flows along an interior surface 18. A plurality of channels, tubes or conduits 22 are attached to an external surface 26 of the main pipe and run in a substantially linear pattern in a direction parallel to the longitudinal axis 50.

Figure 4:
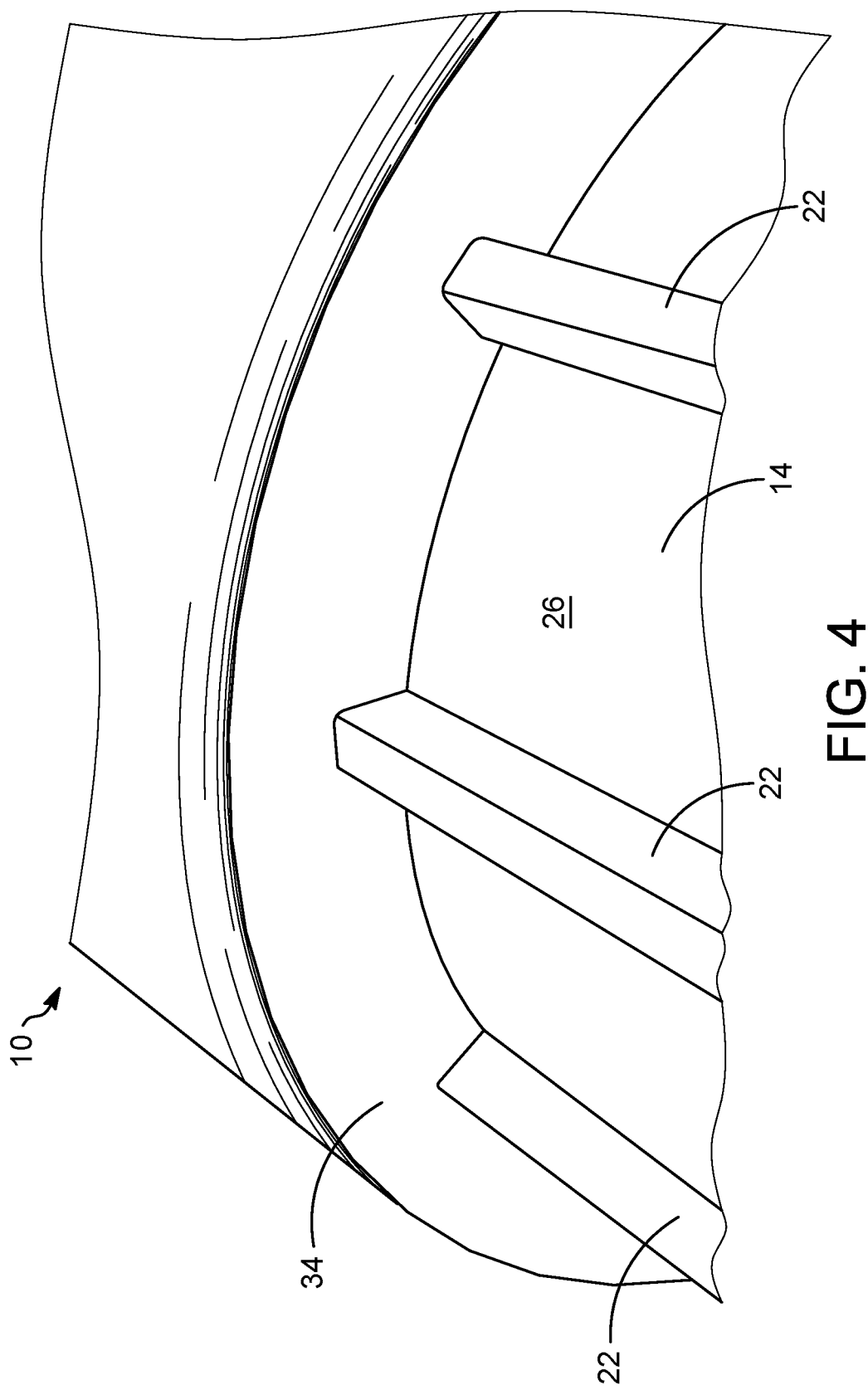
FIG. 4 is a partial view of a pipe system produced according to the present invention with the bump over the channels, tubes or conduits having been compressed so cutting is not required.
Figure 5:
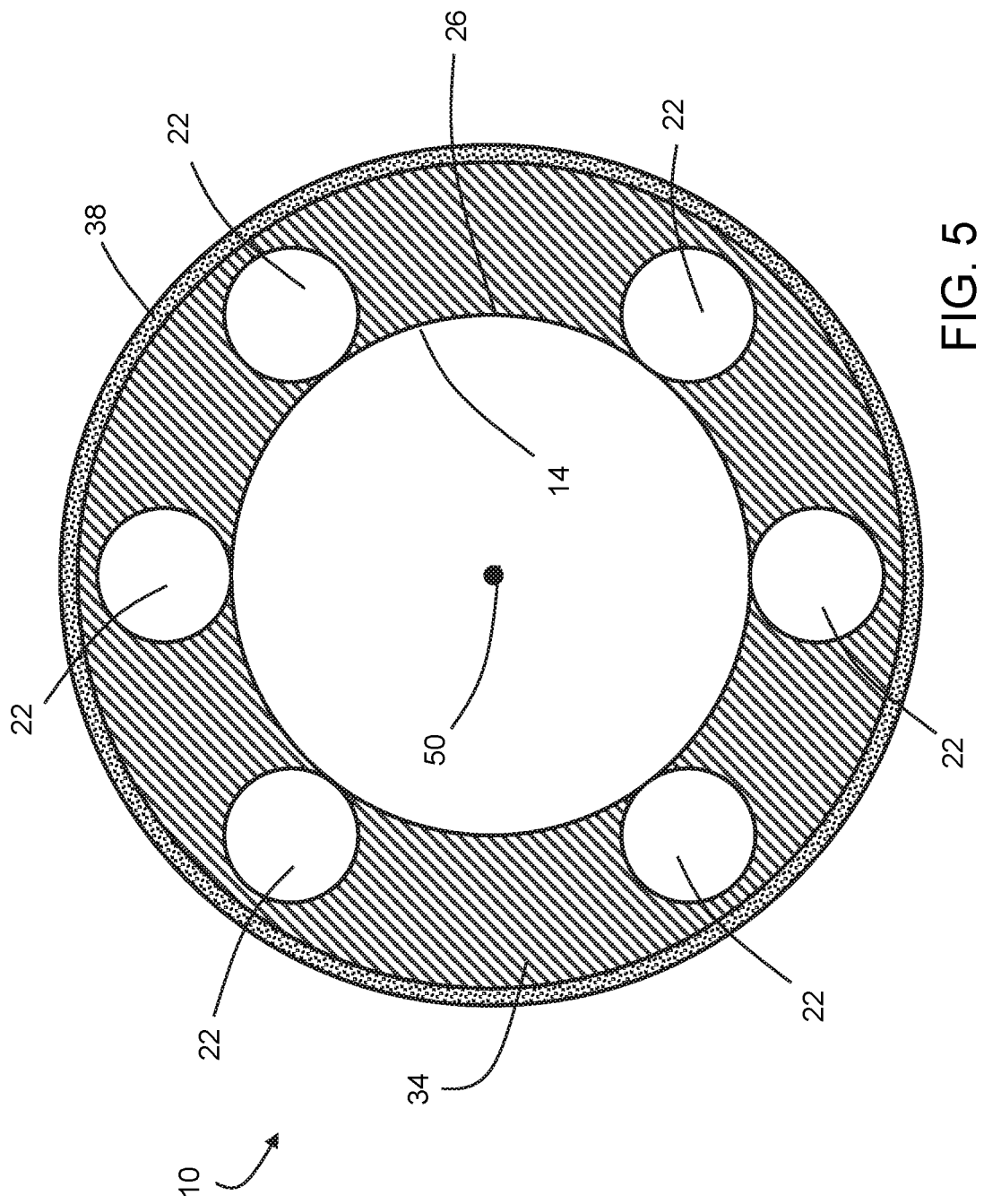
FIG. 5 is a cross-sectional view transverse to the longitudinal axis of a pipe system of the present invention with tubes on the pipe.
Figure 6:
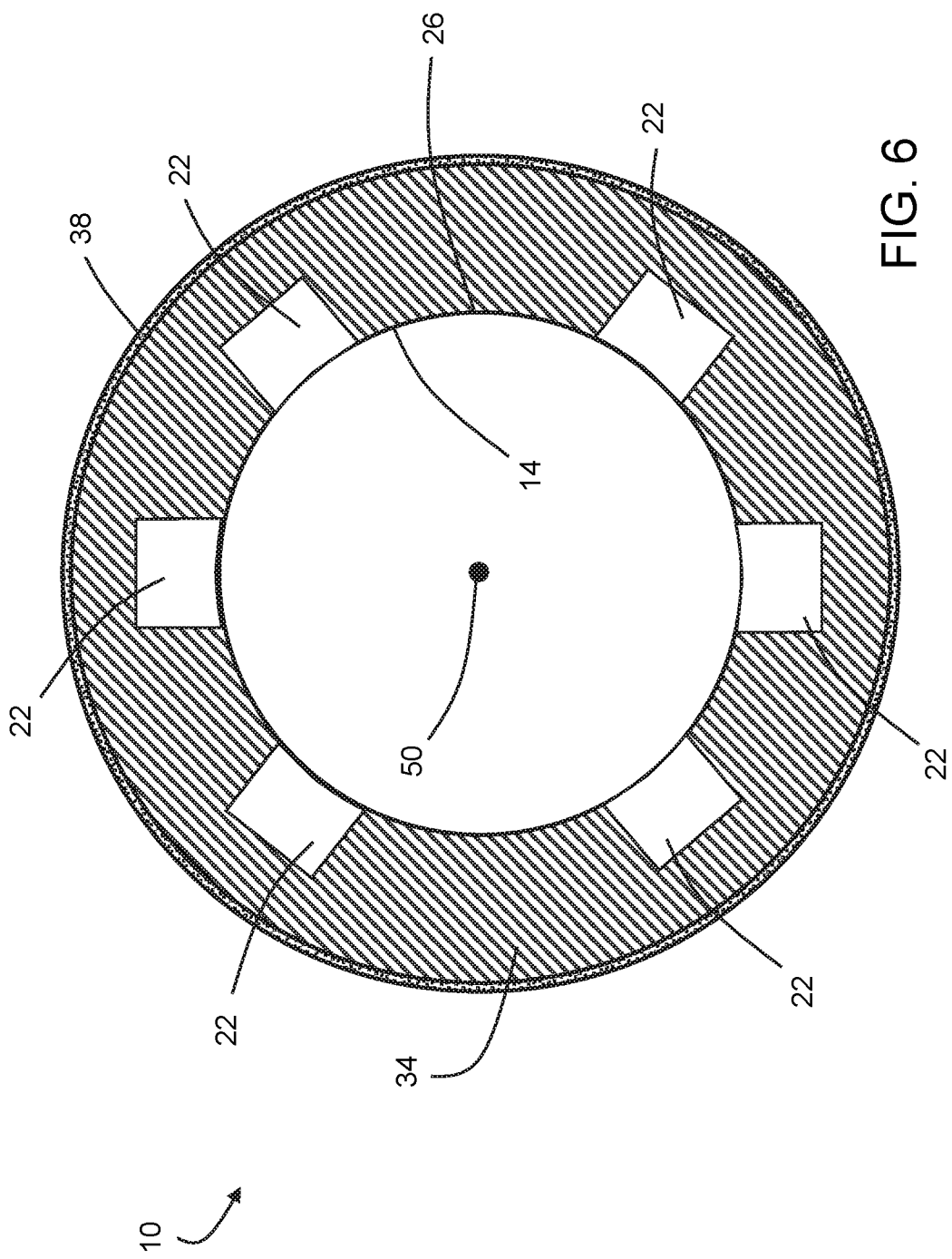
FIG. 6 is a cross-sectional view transverse to the longitudinal axis of a pipe system of the present invention with channels on the pipe.
Figure 7:
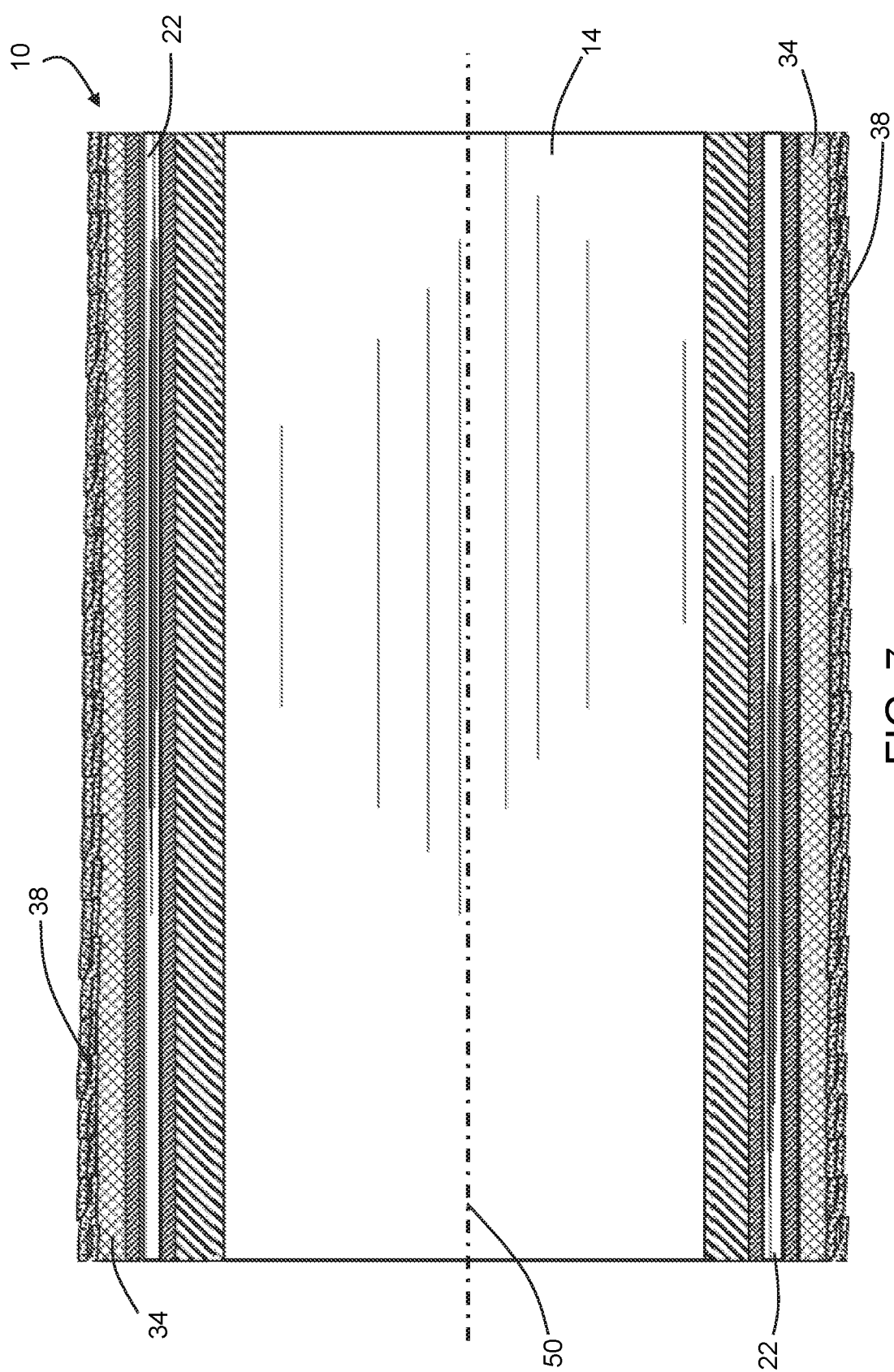
FIG. 7 is a cross-sectional view taken parallel to a longitudinal axis of a pipe system of the present invention.

The channels, tubes or conduits 22 may be tube-like structures as illustrated in FIG. 4. Alternatively, the channels, tubes or conduits 22 can be channels having a rectilinear shape as illustrated in FIG. 5. In either case, the channels, tubes or conduits are adapted or configured, as in sized and shaped, to house heat trace cables, electrical wiring, fiber optic cables, etc. These channels, tubes or conduits 22 are positioned about the circumference of the main pipe 14 and can be equally or unequally spaced or spaced as requirements provide. The channels, tubes or conduits 22 typically have a smaller cross-sectional area than that of the main pipe 14 taken in a direction transverse to the longitudinal axis 50.

Figure 3:
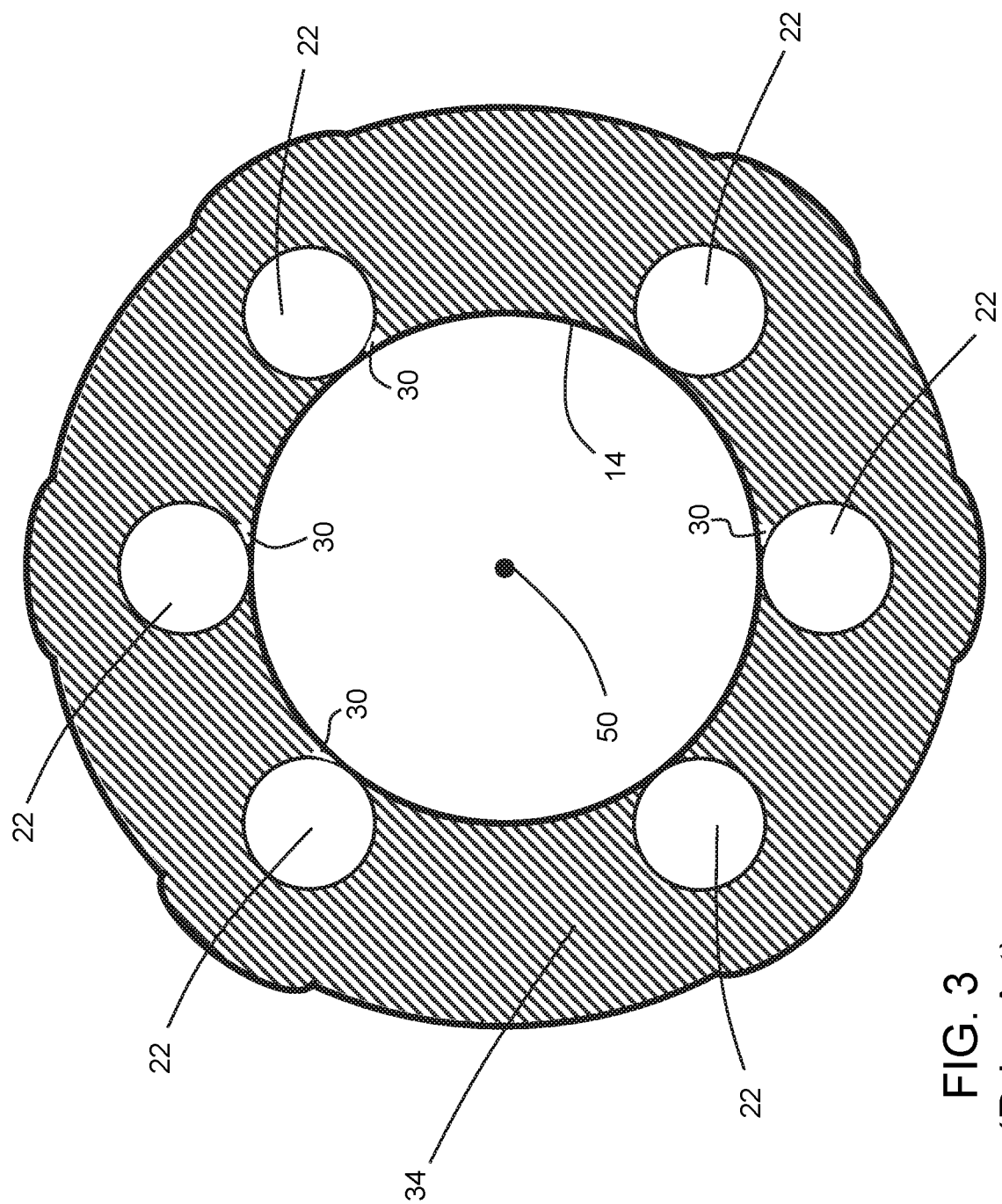
FIG. 3 is a cross-sectional view of a prior art pipe system showing bulges of the spray foam insulation caused by the spray foam insulation deposited over channels, tubes or conduits

Attachment of the channels, tubes or conduits 22 to the external surface 26 of the main pipe 14 may cause small gaps 30, such as crevices, tight corners, and the like, to form at the interface between the channels, tubes or conduits 22 and the main pipe 14. (See, e.g., FIG. 3). These gaps 30 generally run parallel to the longitudinal axis 50 along the external surface 26 of the main pipe 14.

A spray foam insulation 34 is applied to the external surface 26 of the main pipe 14 and to external surfaces of the channels, tubes or conduits 22. The spray foam insulation 34 can be polyurethane, polyisocyanate, polystyrene or another material. The spray foam insulation 34 may form a uniform outer surface on the pipe system 10, such that a diameter of the pipe system 10 is substantially constant about a circumference of the pipe system 10. The spray foam insulation 34, when cured, covers the external surfaces of the channels, tubes or conduits 22 and the main pipe 14 such that no portions of the channels, tubes or conduits and main pipe are visible subsequent to the spray foam insulation 34 being deposited and cured.

The pipe system 10 includes a ribbon-shaped member 38 spirally wrapped about the spray foam insulation 34. The ribbon-shaped member 38 may be a plastic, fabric or metal, or a combination thereof. Examples of suitable materials for the ribbon-shaped member 38 include a corona treated bonding film, corona treated bonding film with a diffusion barrier, an adhesive backed tape, or an adhesive backed tape with diffusion barrier. The corona treatment or adhesive may be on none, one or both sides of the ribbon-shaped member. The wrapping is applied under tension great enough to compress the uncured or partially cured spray foam insulation 34 to produce or form the substantially constant diameter about the circumference Here, the term "substantially" accounts for minor variances in the diameter possibly caused by an overlapping of the ribbon-shaped member 38 as it is spirally wrapped about the spray foam insulation 34 or slight variations in the compression of the foam insulation.

Figure 8:
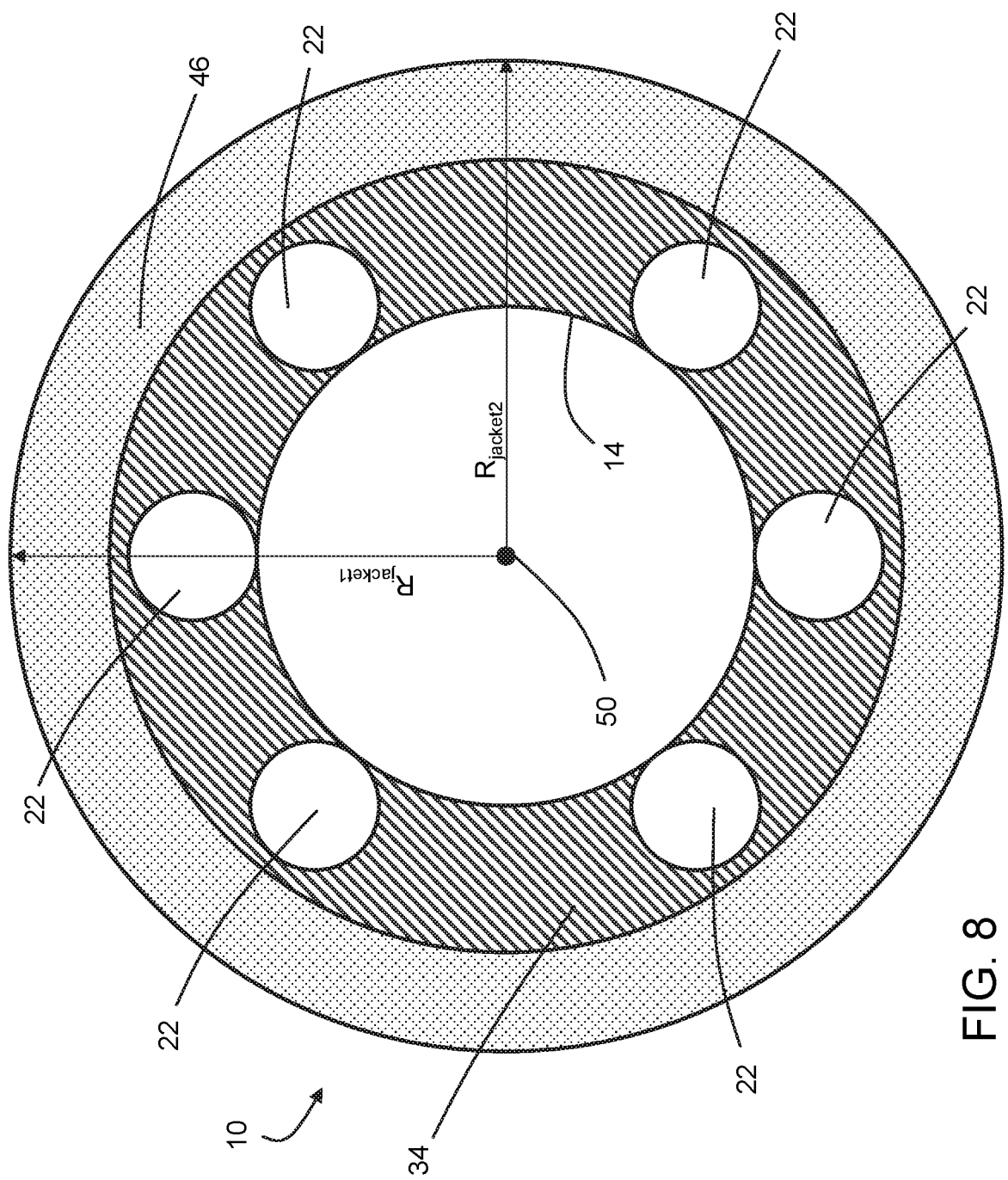
FIG. 8 is a cross-sectional view transverse to a longitudinal axis of a pipe system of the present invention with two (2) layers of foam insulation.

It is further contemplated that the ribbon-shaped member 38 can be removed leaving an exposed external surface 42 of the spray foam insulation 34 as illustrated in FIG. 8. As also illustrated in FIG. 8, a further insulation layer 46 can be applied to the bare spray foam insulation 34. This further insulation layer 46 can be additional spray foam insulation or other insulation jacketing material such as high density polyethylene (HDPE), fiberglass reinforced plastic (FRP), polyvinyl chloride (PVC), aluminum, galvanized, steel, stainless steel or other suitable materials.

Figure 9:
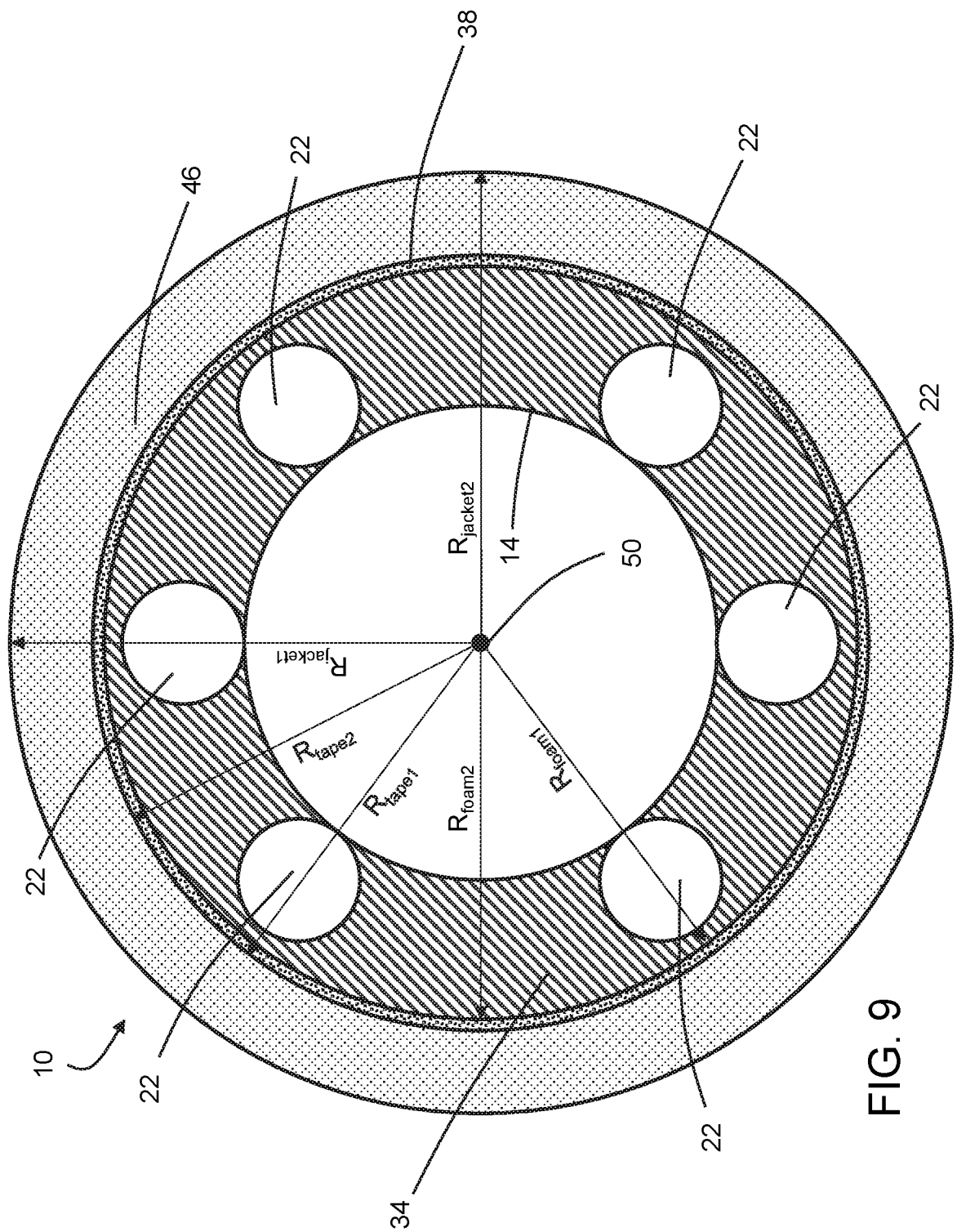
FIG. 9 is a cross-sectional view taken transverse to a longitudinal axis of an alternative embodiment of pipe system of the present invention with two (2) layer of foam insulation and a ribbon-shaped member between layers.

Alternatively, as illustrated in FIG. 9, the further insulation layer 46 can be allied to external surface of the ribbon-shaped member 38.

The substantially constant diameter relationships are illustrated in FIG. 9. Here, a radius $R_{foam1}$ drawn through a channel, tube or conduit 22 is substantially equal to a radius $R_{foam2}$ drawn through a region where it does not intersect a channel, tube or conduit 22. A radius $R_{tape1}$ drawn through a channel, tube or conduit 22 is substantially equal to a radius $R_{tape2}$ drawn through a region where it does not intersect a channel, tube or conduit 22. A radius $R_{jacket1}$ drawn through a channel, tube or conduit 22 is substantially equal to a radius $R_{jacket2}$ drawn through a region where it does not intersect a channel, tube or conduit 22.

The invention is further directed to a method of producing the pipe systems 10 described above. Referring to FIGS. 10-14, a method of producing the pipe systems generally includes: providing a length of a main pipe 14 having an internal surface 18 and an external surface 26; providing a plurality of channels, tubes or conduits 22 attached to the external surface 26 of the main pipe 14 and spaced about a circumference thereof; applying a spray foam insulation 34 to the external surface 26 of the main pipe 14 from a source 56 of the spray foam insulation 34; and prior to a step of curing the spray foam insulation 34, applying a compressive force against an exposed outer surface of the spray foam insulation 34.

Figure 10:
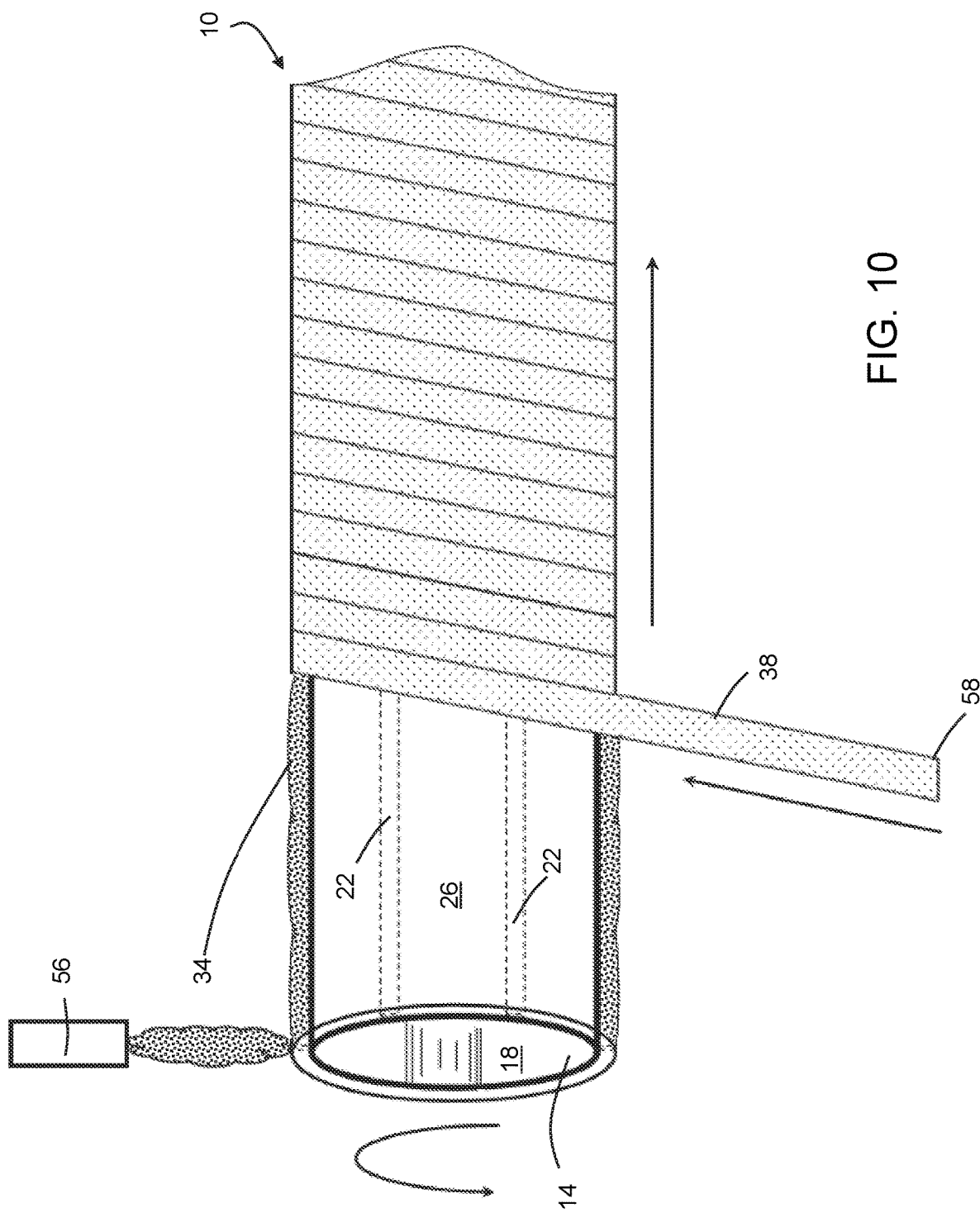
FIG. 10 is a side view of a pipe system of the present invention showing a ribbon-shaped member being applied to a main pipe with a portion of the spray foam transparent to show the channels, tubes or conduits.
Figure 11:
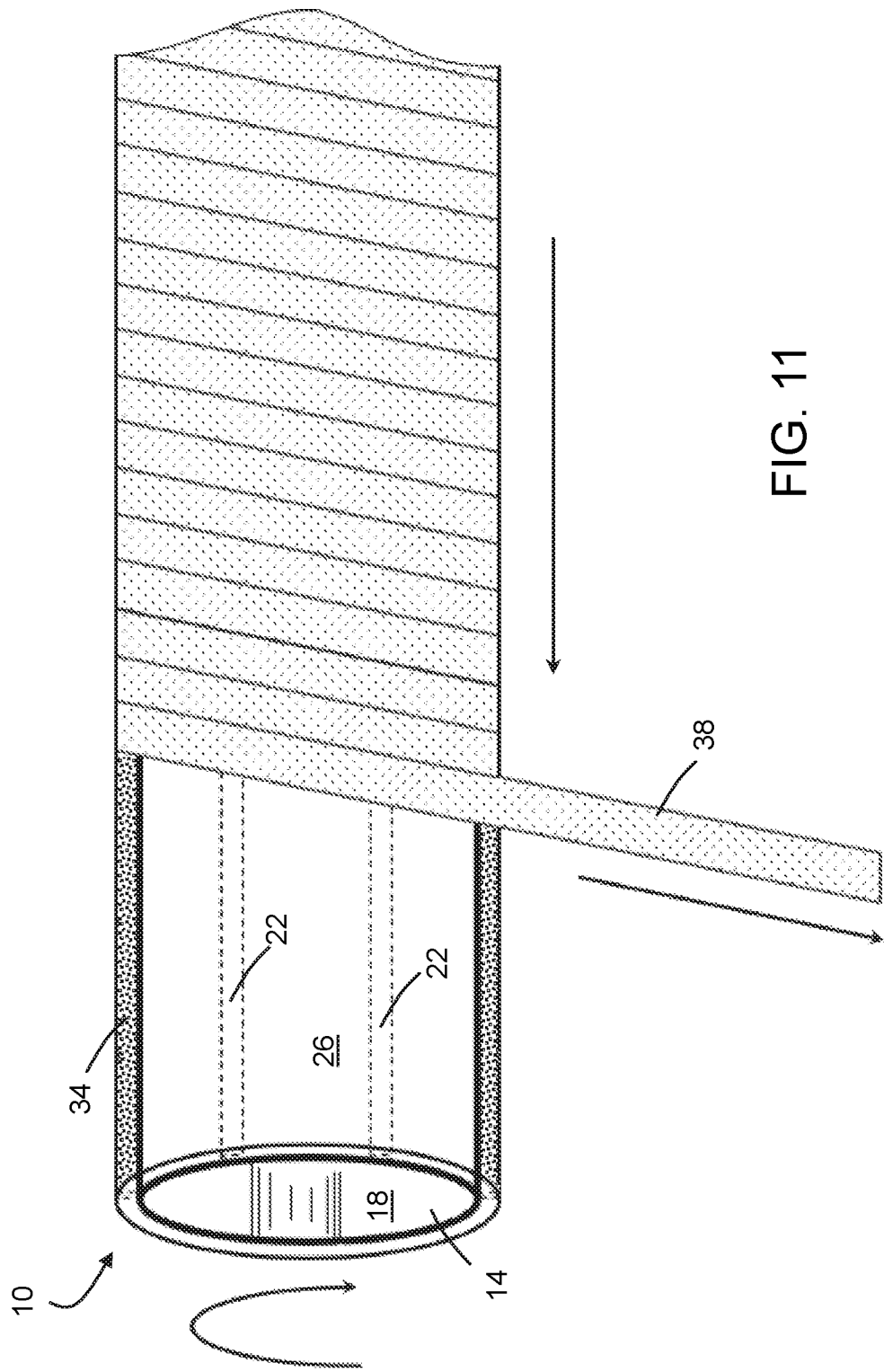
FIG. 11 is a side view of a pipe system of the present invention showing a ribbon-shaped member being removed from main pipe with a portion of the spray foam transparent to show the conduits.
Figure 12:
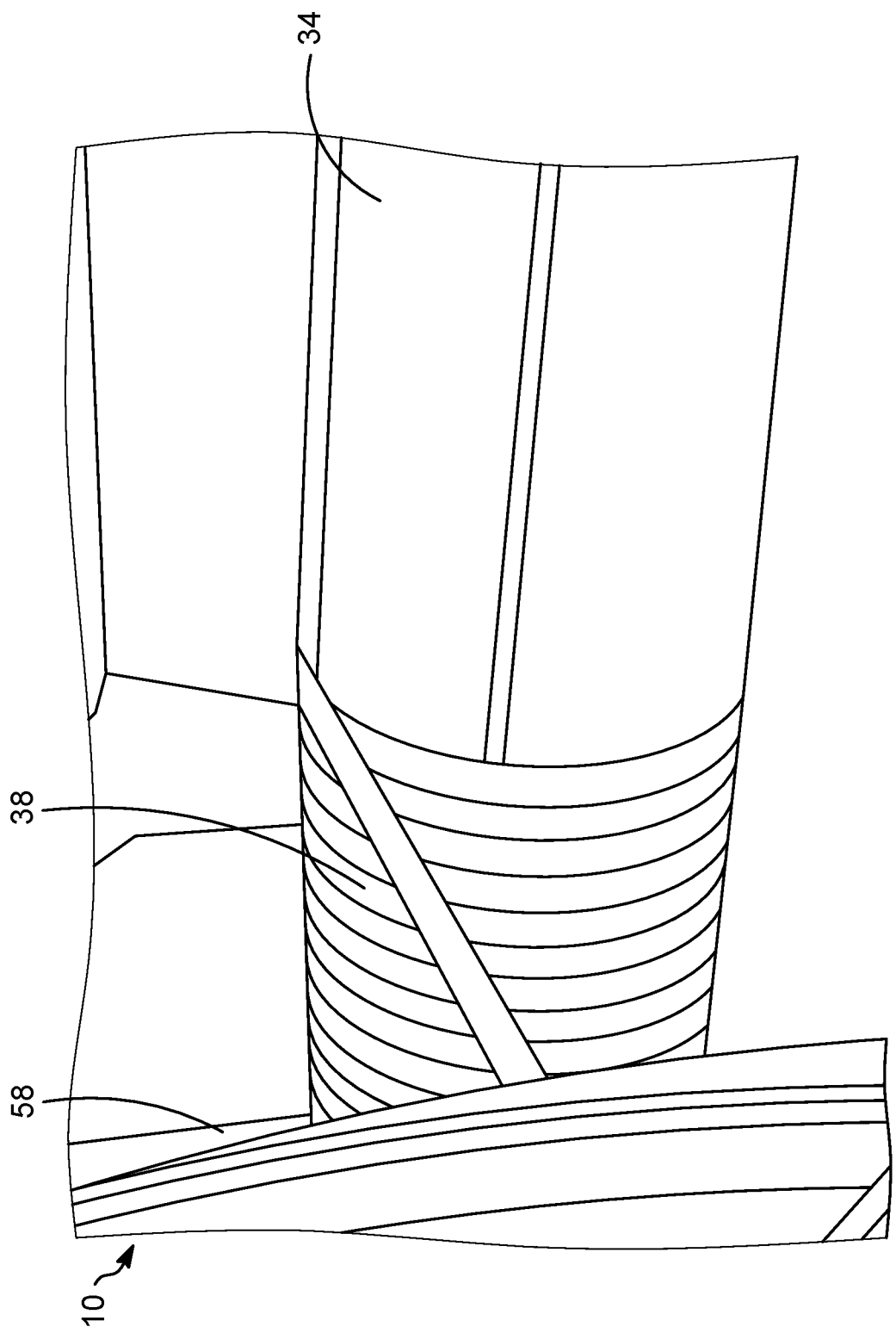
FIG. 12 is a view of a pipe system of the present invention showing a ribbon-shaped member being applied to a main pipe with a portion of the spray foam prior to application of the ribbon-shaped member visible to show the insulation bump that forms over the channels, tubes of conduits and the compression of the bump formed over the channels, tubes or conduits by the ribbon-shaped member.

As illustrated in FIGS. 10 and 11, compressive force may be supplied by wrapping a ribbon-shaped member 38 under tension about the spray foam insulation 34, the plurality of channels, tubes or conduits 22 and the main pipe 14 in successive overlapping passes. The successive overlapping passes of the ribbon-shaped member 38 are accomplished by relative rotational and linear movements applied between the main pipe 14 and a source 58 of the ribbon-shaped member 38. The relative rotation is illustrated by a counterclockwise oriented arrow drawn about the longitudinal axis 50 (not shown) on FIG. 10, and the relative linear motion is illustrated by the linear arrow drawn parallel to the longitudinal axis 50 (not shown) in FIG. 10.

As described, the method produces a substantially uniform diameter of the pipe system 10 such that a radius of the pipe system passing through a channel, tube or conduit in the plurality of channels, tubes or conduits is substantially equal to a radius of the pipe system not passing through a channel, tube or conduit 22.

The spray foam insulation 34 can be cured or at least partially cured with the ribbon-shaped member 38 still applied.

An additional layer of insulation, e.g., another application of spray foam insulation 34, may be applied to an exposed outer surface of the ribbon-shaped member 38 after the wrapping step. This additional layer is applied according to the procedure illustrated in FIG. 10. Rather than the spray foam insulation 34 being applied to the external surfaces of the main pipe 14 and the channels, tubes or conduits 22, it is applied directly to the exposed surface of the ribbon-shaped member 34 to produce the embodiment illustrated in FIG. 9. Alternatively, the additional insulation layer can be an insulation jacket or other type of insulation as deemed fit for a particular end use.

As illustrated in FIG. 11, the ribbon-shaped member 38 can be removed from the pipe system 10. The successive overlapping passes of the ribbon-shaped member 38 are removed by relative rotational and linear movements applied between the main pipe 14 and the ribbon-shaped member 38. The relative rotation is illustrated by a clockwise oriented arrow drawn about the longitudinal axis 50 (not shown) on FIG. 11, and the relative linear motion is illustrated by the linear arrow drawn parallel to the longitudinal axis 50 (not shown) in FIG. 11. These motions are generally the opposite as those shown in FIG. 10 for application of the ribbon-shaped member 38.

The additional layer of insulation 46, e.g. a further layer of spray foam insulation 34, may be applied after the step of removing of the ribbon-shaped member 34. This additional layer 46 can be applied according to the procedure illustrated in FIG. 10. Alternatively, the additional insulation layer 46 can be an insulation jacket or other type of insulation as deemed fit for a particular end use.

Figure 13:
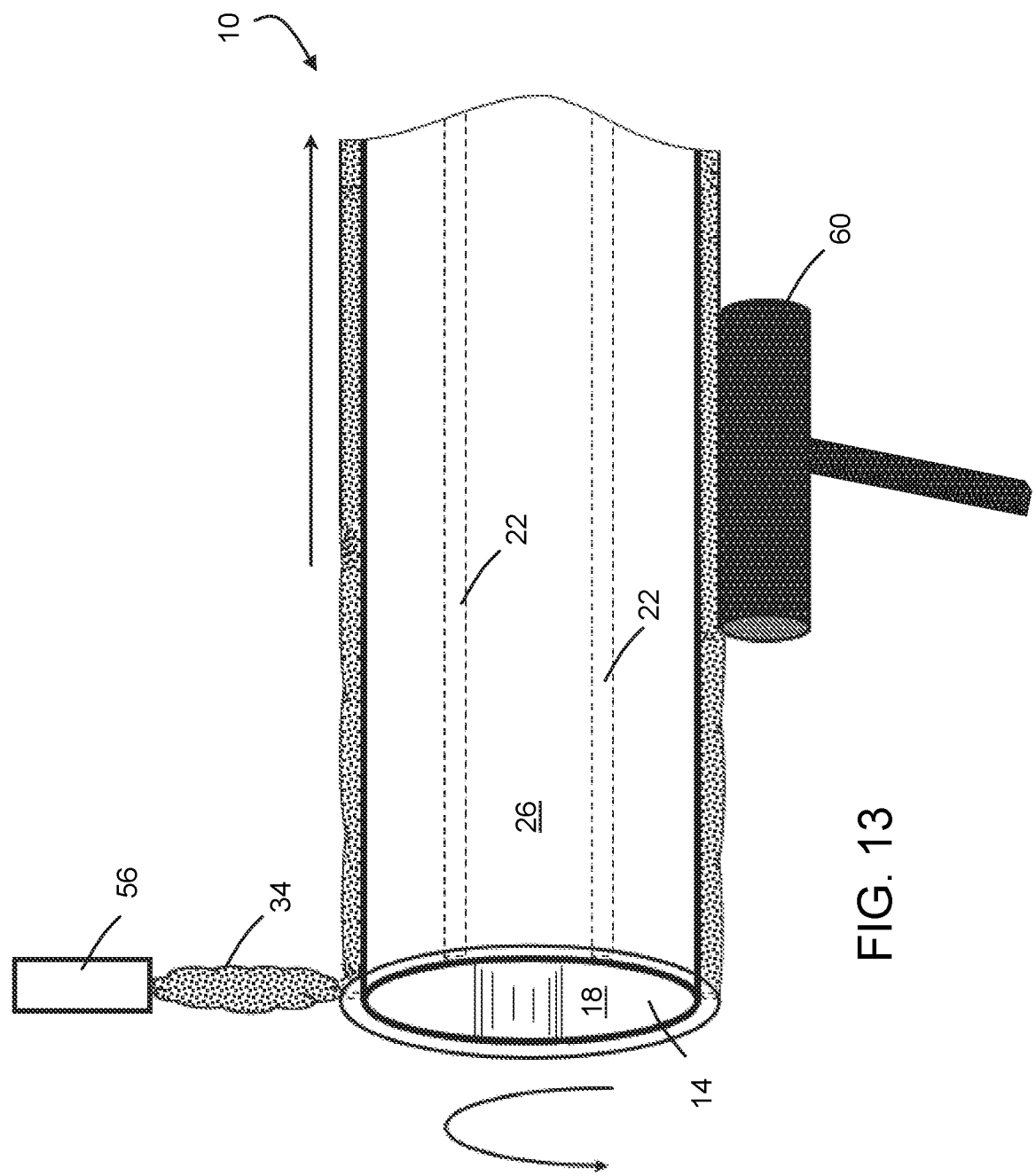
FIG. 13 is a side view of a pipe system of the present invention showing a pressure roller engaging a spray foam insulation layer and compressing the insulation bump that forms over the channels, tubes or conduits.

As illustrated in FIG. 13, a method of producing a pipe system 10 of the present invention, e.g. the embodiment illustrated in FIG. 8 or a variation thereof without the further layer of insulation, comprises engaging the spray foam insulation 34 with a pressure roller 60 wherein the compressive force is supplied by the step of engaging the spray foam insulation 34 with the pressure roller 60. Similar to previous embodiments, relative rotational and linear movements between the main pipe 14 and the pressure roller 60.

This method may also produce a substantially uniform diameter of the pipe system 10 such that a radius of the pipe system 10 passing through a channel, tube or conduit 22 in the plurality of channels, tubes or conduits is substantially equal to a radius of the pipe system 10 not passing through a channel, tube or conduit 22.

An additional layer of insulation 46, e.g. a spray foam insulation layer or a further layer of another type of insulation can be applied to an exposed outer surface of the spray foam insulation 34.

Figure 14:
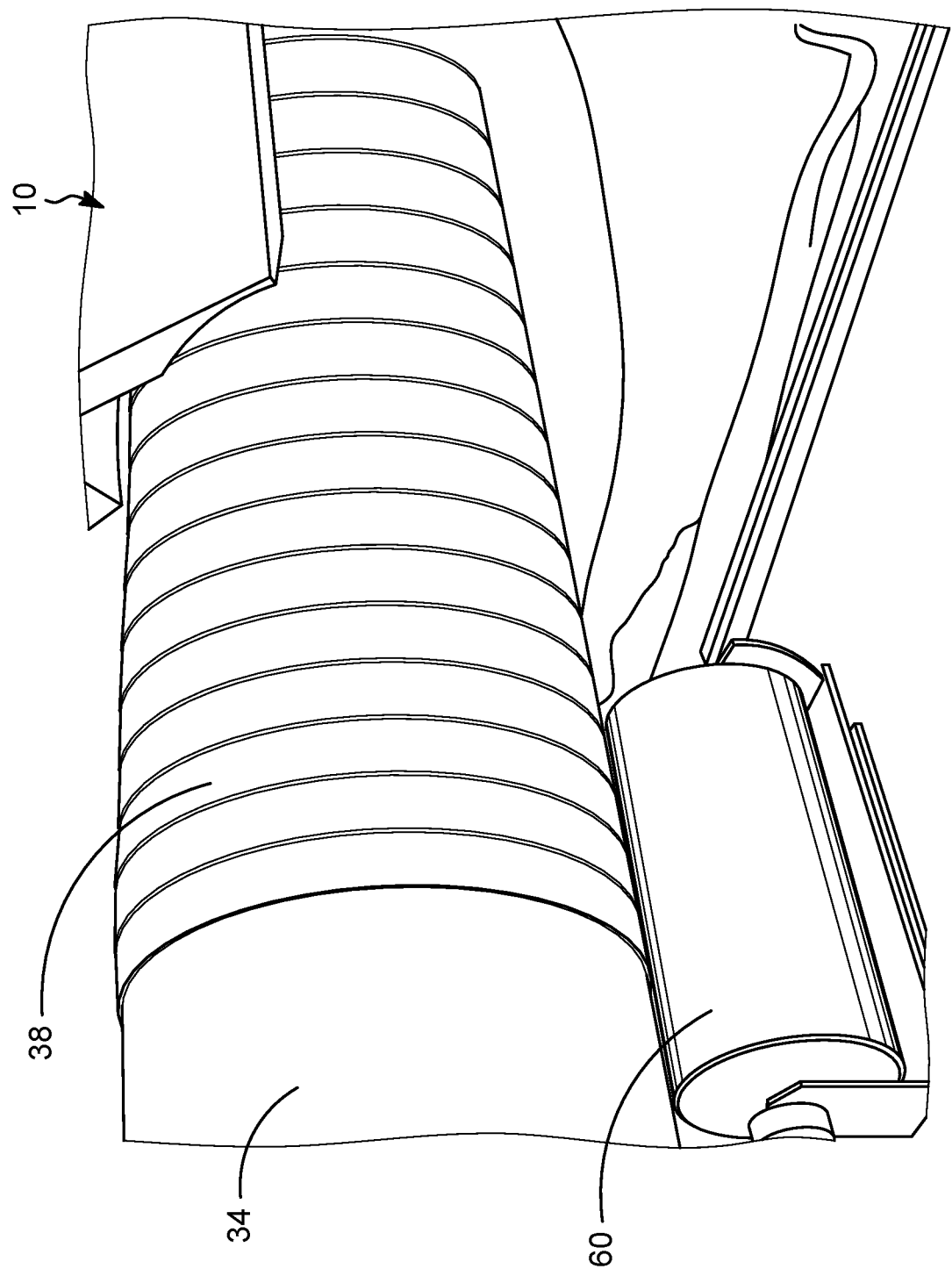
FIG. 14 is a view of a pressure roller applying a compressive force to a pipe system and a ribbon-shaped member being applied to the pipe system to compress the insulation bump that forms over the channels, tubes or conduits.

As illustrated in FIG. 14, a method for producing a pipe system 10 may include compressive forces supplied by a ribbon-shaped member 38 and a pressure roller 60 in combination. Here, the spray-foam insulation 34 can be engaged first with the ribbon-shaped member 38 and subsequently with the pressure roller 60 after the wrapping step. Alternatively, the pressure roller 60 can be applied to the spray foam insulation prior to the wrapping step.

It should be understood the spray foam insulation 34 may be deposited on a bare surface of the main pipe 14 such that gaps 30 between the bare surface of the main pipe 14 and each of the plurality of channels, tubes or conduits 22 are filled with the spray foam insulation 34. A filling of the spray foam insulation 34 into the gaps 30 prevents moisture from entering the pipe system 10 between the spray foam insulation 34 and the main pipe 14 into the gaps 30. This penetration of the spray foam insulation 34 into the gaps 30 prevents moisture from being entrapped between the spray foam insulation 34 and the main pipe 14. This cannot be adequately and/or reliably achieved in prior methods of producing pipe systems 10 of the type described herein.

While the specific embodiments have been illustrated and described, numerous modifications come to mind without significantly departing from the spirit of the invention, and the scope of protection is only limited by the scope of the accompanying Claims.

What is claimed is:

1. A method of insulating a pipe system comprising the steps of:
   providing a length of a main pipe having an internal surface and an external surface;
   providing a plurality of channels, tubes or conduits attached to the external surface of the main pipe and spaced about a circumference thereof;
   applying a spray foam insulation to the external surface of the main pipe; and
   prior to a step of curing the spray foam insulation, applying a compressive force against an exposed outer surface of the spray foam insulation to prevent a bulge from forming over the channels, tubes or conduits so that the outer surface of the insulation has a uniform radius; and
   wrapping a ribbon-shaped member under tension about the spray foam insulation, the plurality of channels, tubes or conduits and the main pipe in successive overlapping passes wherein the compressive force is supplied by the ribbon-shaped member.

2. The method of claim 1 wherein the ribbon-shaped member may be a plastic, fabric or metal, or a combination thereof.

3. The method of claim 2 further comprising the step of:
   providing relative linear movement between the main pipe and the source of the ribbon-shaped member.

4. The method of claim 3 further comprising the step of:
   producing a substantially uniform diameter of the pipe system such that a radius of the pipe system passing through a channel, tube or conduit in the plurality of channels, tubes or conduits is substantially equal to a radius of the pipe system not passing through a channel, tube or conduit.

5. The method of claim 4 further comprising the step of: curing the spray foam insulation.

6. The method of claim 5 further comprising the step of:
   applying an additional layer of spray foam insulation to an exposed outer surface of the ribbon-shaped member after the wrapping step.

7. The method of claim 1 wherein an adhesive is applied between the ribbon-shaped member and the spray foam insulation.

8. The method of claim 1 wherein the ribbon-shaped member is selected from the group consisting of a corona treated bonding film, corona treated bonding film with a diffusion barrier, an adhesive backed tape, and an adhesive backed tape with diffusion barrier.

9. The method of claim 1 further comprising the step of:
   providing relative rotational movement between the main pipe and a source of the ribbon-shaped member.

10. The method of claim 1 further comprising the step of:
    engaging the ribbon-shaped member with a pressure roller after the wrapping step.

11. The method of claim 1 further comprising the step of:
    engaging the spray foam insulation with a pressure roller wherein the compressive force is further supplied by the step of engaging the spray foam insulation with the pressure roller.

12. The method of claim 11 further comprising the step of:
    providing relative rotational movement between the main pipe and the pressure roller.

13. The method of claim 12 further comprising the step of:
    providing relative linear movement between the main pipe and the pressure roller.

14. The method of claim 13 further comprising the step of:
    producing a substantially uniform diameter of the pipe system such that a radius of the pipe system passing through a channel, tube or conduit in the plurality of channels, tubes or conduits is substantially equal to a radius of the pipe system not passing through a channel, tube or conduit.

15. The method of claim 14 further comprising the step of: curing the foam insulation.

16. The method of claim 15 further comprising the step of:
    applying an additional layer of insulation or insulation jacket to an exposed outer surface of spray foam insulation.

17. The method of claim 1 wherein the spray foam insulation is deposited on a surface of the main pipe such that gaps between the surface of the main pipe and each of the plurality of conduits is filled with the spray foam insulation.

18. The method of claim 17 wherein a filling of the spray foam insulation into the gaps prevents moisture from entering the pipe system between the spray foam insulation and the main pipe into the gaps.

19. The method of claim 1 wherein a filling of the spray foam insulation into the gaps prevents moisture from being entrapped between the spray foam insulation and the main pipe.

20. A method of insulating a pipe system comprising the steps of:
    providing a length of a main pipe having an internal surface and an external surface;
    providing a plurality of channels, tubes or conduits attached to the external surface of the main pipe and spaced about a circumference thereof;
    applying a spray foam insulation to the external surface of the main pipe;
    prior to a step of curing the spray foam insulation, applying a compressive force against an exposed outer surface of the spray foam insulation to prevent a bulge from forming over the channels, tubes or conduits so that the outer surface of the insulation has a uniform radius;
    wrapping a ribbon-shaped member under tension about the spray foam insulation, the plurality of channels, tubes or conduits and the main pipe in successive overlapping passes wherein the compressive force is supplied by the ribbon-shaped member; and
    removing the ribbon-shaped member from the main pipe.

21. The method of claim 20 further comprising the step of:
    applying an additional layer of insulation after the step of removing of the ribbon-shaped member.

* * * * *